(12) United States Patent
Huang et al.

(10) Patent No.: US 8,068,787 B2
(45) Date of Patent: *Nov. 29, 2011

(54) POWER SUPPLY DEVICE AND WIRELESS COMMUNICATION SYSTEM

(75) Inventors: Chien-Hua Huang, Caotun Township, Nantou County (TW); Wen-Hung Wang, Caotun Township, Nantou County (TW); Yu-Kun Hung, Caotun Township, Nantou County (TW); Li-Chi Chiu, Caotun Township, Nantou County (TW)

(73) Assignee: Universal Scientific Industrial (Shanghai) Co., Ltd., Shanghai (CN)

( * ) Notice: Subject to any disclaimer, the term of this patent is extended or adjusted under 35 U.S.C. 154(b) by 567 days.

This patent is subject to a terminal disclaimer.

(21) Appl. No.: 12/205,851

(22) Filed: Sep. 6, 2008

(65) Prior Publication Data

US 2010/0073856 A1    Mar. 25, 2010

(51) Int. Cl.
*H04B 7/00* (2006.01)

(52) U.S. Cl. .......... 455/66.1; 455/67.7; 455/68
(58) Field of Classification Search ......... 455/66.1, 455/67.7, 68, 115.3, 127.1, 226.2
See application file for complete search history.

*Primary Examiner* — Tuan H Nguyen
(74) *Attorney, Agent, or Firm* — Chun-Ming Shih

(57) ABSTRACT

A power supply device and a wireless communication system are provided. The power supply device includes a data input port, a power over Ethernet control module, a network port, a decoder circuit and a signal strength indicator unit. The power over Ethernet control module is configured for receiving a data signal from the data input port to generate a data signal with power. The network port is configured for transmitting the data signal with power to the main board and receiving a signal in relation to a signal receiving strength state of the wireless communication device. The decoder circuit is connected to the network port and configured for generating a signal strength indicator signal. The signal strength indicator unit is connected to the decoder circuit and configured for receiving the signal strength indicator signal to display the signal receiving strength state of the wireless communication device.

20 Claims, 4 Drawing Sheets

POWER SUPPLY DEVICE AND WIRELESS COMMUNICATION SYSTEM

BACKGROUND

1. Field of the Invention

The present invention relates to the wireless communication technology field, and more specifically, to a power supply device and a corresponding wireless communication system.

2. Description of the Related Art

Currently, with the rapid development of the network, various wireless communication systems (for example, WiMax wireless communication system) adapted into the Ethernet to be as data transmission interfaces, are widely used. A conventional wireless communication system includes a power supply device and a wireless communication device (for example, wireless base station) under the 802.3af protocol. The power supply device includes an RJ-45 input port, a power over Ethernet control module, and an RJ-45 output port. The wireless communication device is generally arranged outdoors and connected to the RJ-45 output port via a network cable. The power over Ethernet control module is configured for receiving a data signal from the RJ-45 input port to generate and transmit a data signal with power to the RJ-45 output port. The data signal with power is then transmitted to the wireless communication device through the network cables, such that the wireless communication device can be not limited by the power line and be convenient in use.

However, when erecting and/or repairing the wireless communication device used outdoors, the wireless communication system must be debugged at the erecting position. Thus it will spend long time to finish erecting and/or repairing.

What is needed, is providing a power supply device and a wireless communication system, which can solve the above problems.

BRIEF SUMMARY

A power supply device in accordance with an exemplary embodiment of the present invention, is provided. The power supply device is adapted to an outdoor wireless communication device via a network cable. The wireless communication device includes a main board having at least one control line and a ground line arranged thereon. The power supply device includes a data input port, a power over Ethernet control module, a network port, a decoder circuit and a signal strength indicator unit. The power over Ethernet control module is configured for receiving a data signal from the data input port to generate a data signal with power. The network port is configured for transmitting the data signal with power to the main board of the wireless communication device and receiving a signal in relation to a signal receiving strength state of the wireless communication device provided from the at least one control line and the ground line arranged on the main board. The decoder circuit is connected to the network port and configured for generating a signal strength indicator signal according to the signal provided from the at least one control line and the ground line. The signal strength indicator unit is connected to the decoder circuit and configured for receiving the signal strength indicator signal to display the signal receiving strength state of the wireless communication device.

Preferably, the power supply device further includes a reset button connected to the power over Ethernet control module and configured for turning on a reset circuit of the main board to reset the wireless communication device. Furthermore, the reset button is configured for inversing the power in the data signal with power to turn on the reset circuit of the main board.

Preferably, the power supply device further includes an isolation circuit coupled between the network port and the decoder circuit.

A wireless communication system in accordance with another exemplary embodiment of the present invention is provided. The wireless communication system includes an outdoor wireless communication device and a power supply device. The wireless communication device includes a main board and a first network port. The first network port is connected to the main board. The main board includes at least one control line and a ground line arranged thereon, and the at least one control line and the ground line are connected to the network port. The power supply device includes a data input port, a power over Ethernet control module, a second network port, a decoder circuit and a signal strength indicator unit. The power over Ethernet control module is configured for receiving a data signal from the data input port to generate a data signal with power. The second network port is connected to the first network port via a network cable, and configured for transmitting the data signal with power to the main board of the wireless communication device and receiving a signal in relation to a signal receiving strength state of the wireless communication device provided from the at least one control line and the ground line arranged on the main board. The decoder circuit is connected to the second network port and configured for generating a signal strength indicator signal according to the signal provided from the at least one control line and the ground line. The signal strength indicator unit is connected to the decoder circuit and configured for receiving the signal strength indicator signal to display the signal receiving strength state of the wireless communication device.

Preferably, the power supply device of the wireless communication system further includes a reset button connected to the power over Ethernet control module and configured for turning on a reset circuit of the main board to reset the wireless communication device. Furthermore, the reset button is configured for inversing the power in the data signal with power to turn on the reset circuit of the main board.

Preferably, the power supply device further includes an isolation circuit coupled between the network port and the decoder circuit.

The present exemplary embodiment employs the circuit frame of the power supply device including the decoder circuit and the signal strength indicator unit, and the corresponding circuit frame of the outdoor wireless communication device, such that the power supply device can display the signal receiving strength state of the outdoor wireless communication device. Therefore, the signal receiving strength state displayed on the power supply device may be a base for repairing men in the erecting and off-line or repairing process, such that the erecting and repairing time can be decreased. Furthermore, the signal receiving strength state displayed on the power supply device is prone to judge the current signal connecting state of the wireless communication device for the repairing men. In addition, the reset button is convenient to reload or reset the wireless communication device. The isolation circuit can avoid effectively the electromagnetic interference.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe exemplary embodiments of the present power supply device, in detail. The following description is given by way of example, and not limitation.

Referring to FIGS. 1-4, a wireless communication system in accordance with an exemplary embodiment of the present invention, is provided. The wireless communication system 10 includes a wireless communication device 12 and a power supply device 14. The wireless communication device 12 is generally arranged outdoors, and the power supply device 14 is configured for supplying power and data signals to the wireless communication device 12 via a network cable 13.

Figure 1:
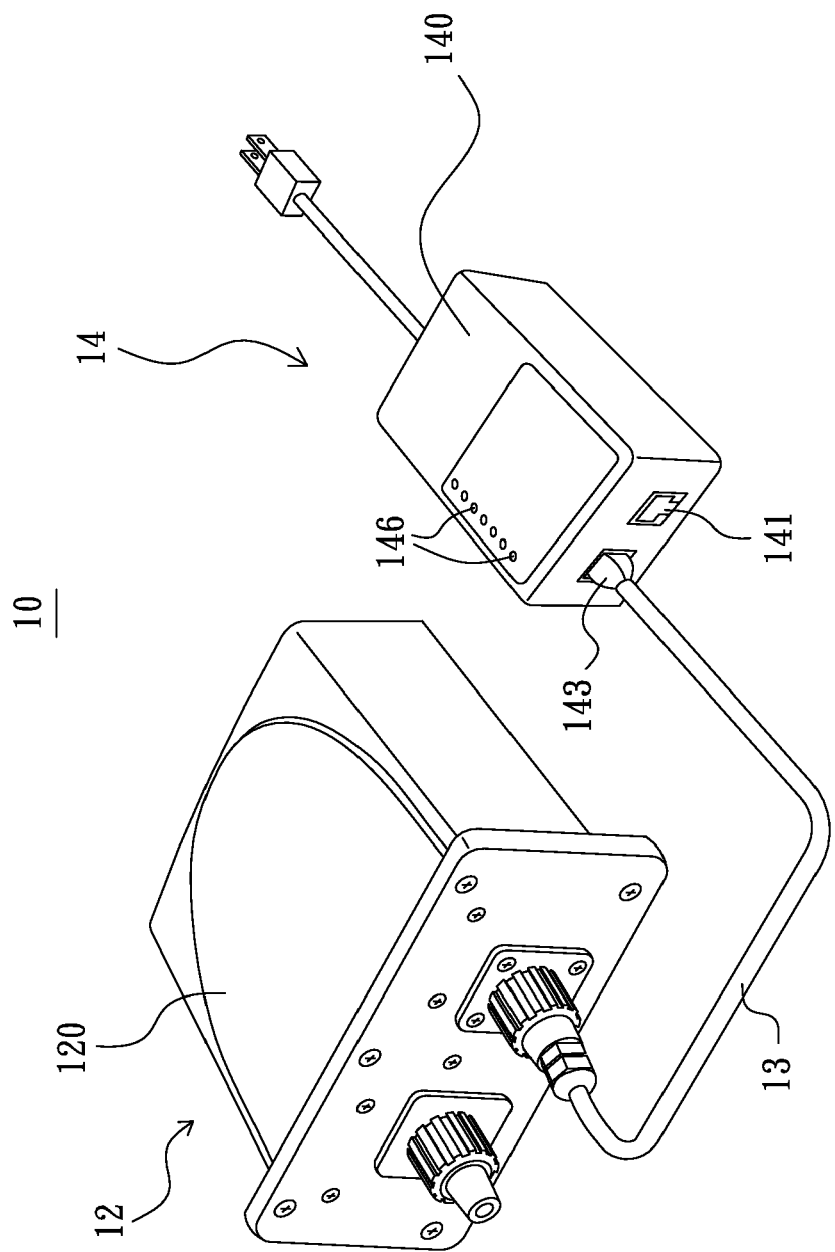
FIG. 1 is a schematic view of a wireless communication system, in accordance with an exemplary embodiment of the present invention.
Figure 2:
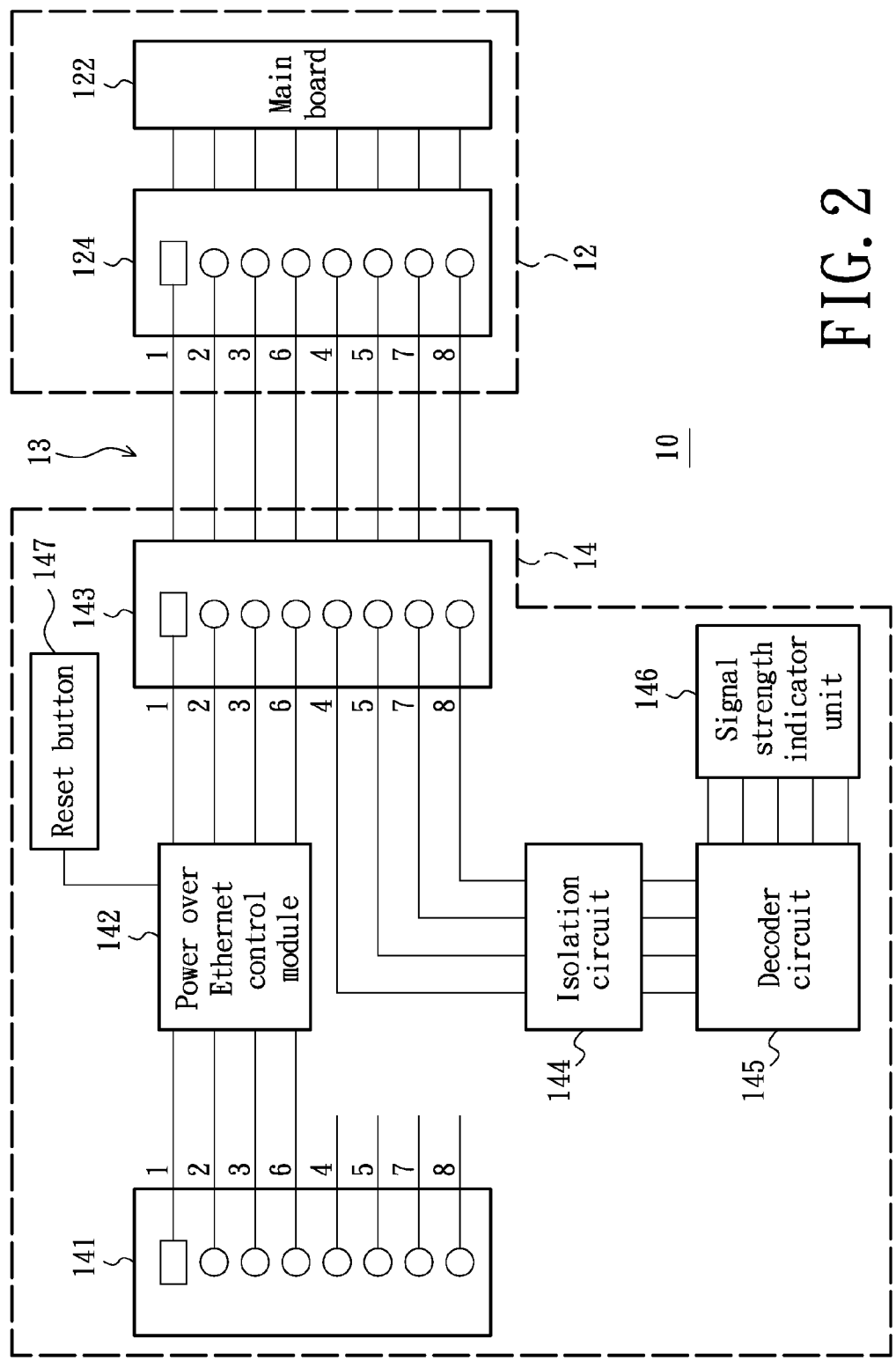
FIG. 2 is a functional, block diagram of the wireless communication system as shown in FIG. 1.

As shown in FIGS. 1 and 2, the wireless communication device 12 includes a shell 120, a main board 122 and a network port 124. The main board 122 is arranged in the shell 120. The network port 124 is connected to the main board 122, fixed on and exposed out of the shell 120. The network port 124 may be an Ethernet port, such as RJ-45 port. Pins 1, 2, 3 and 6 of the network port 124 are used as signal pins and connected to signal wire pairs of the network cable 13 respectively for receiving data signals with power. Pins 4, 5, 7 and 8 of the network port 124 are used as spare pins and connected to spare wire pairs of the network cable 13 respectively.

Figure 3:
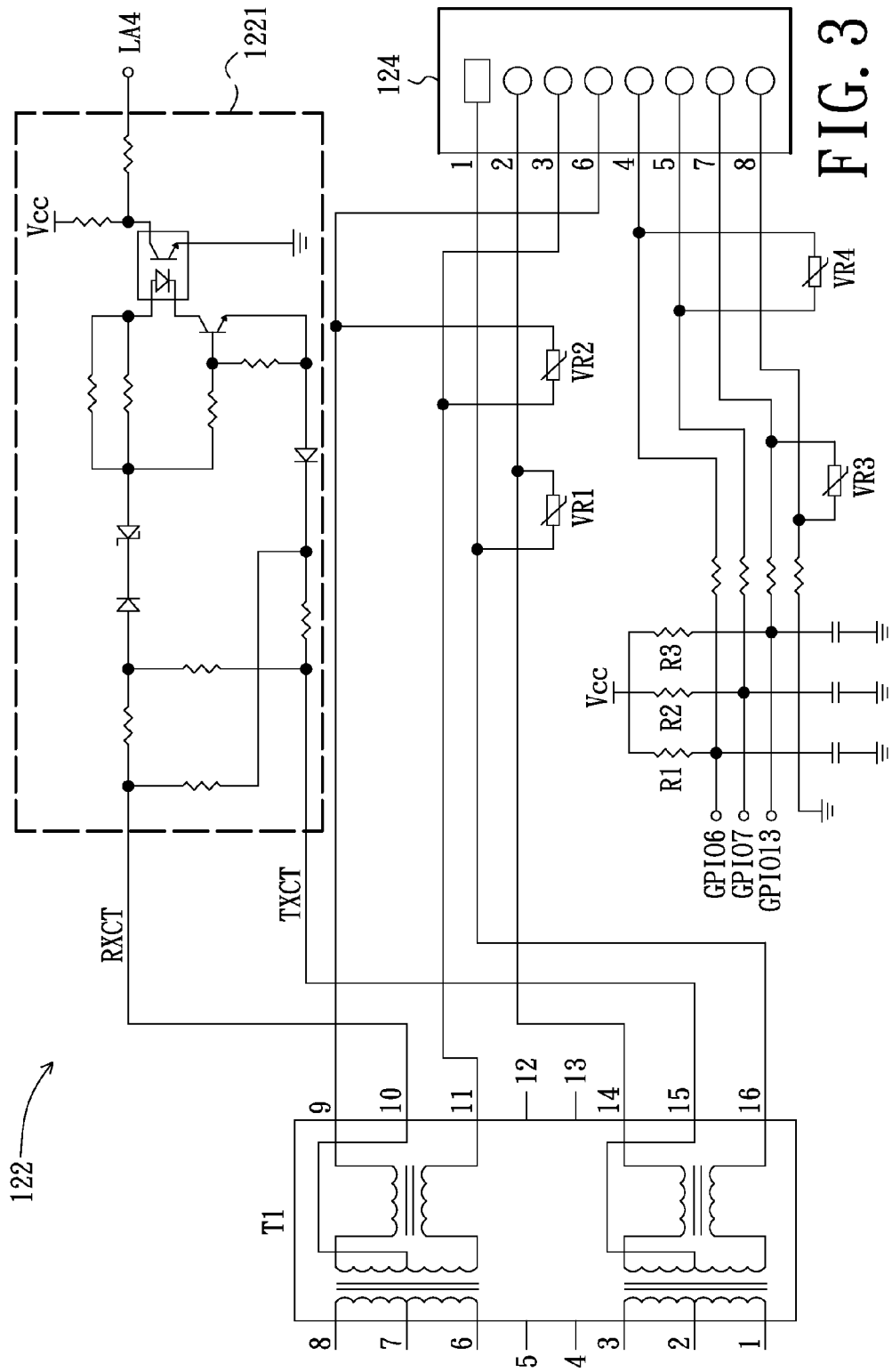
FIG. 3 is a part circuit, block diagram of a main board of the wireless communication system as shown in FIG. 21

Referring to FIG. 3, the main board 122 includes a transformer T1, a reset circuit 1221, three control lines GPIO6, GPIO7 and GPIO13, and a ground line GND arranged thereon. The transformer T1 is connected to the signal pins 1, 2, 3, and 6 of the network port 124 for receiving and transmitting the data signals and the power of the data signals with power to other circuits of the main board 122, such as the reset circuit 1221. Input terminals RXCT and TXCT of the reset circuit 1221 are connected to the transformer T1 for receiving the power supplied from the transformer T1. Output terminal LA4 of the reset circuit 1221 is connected to a CPU (not shown) of the main board 122. When the voltages supplied to the input terminals RXCT and TXCT of the reset circuit 1221 are inversed, the voltage of the output terminal LA4 will be switched logically (for example, from the high logic state to the low logic state). The CPU of the main board 122 is configured for reloading or resetting the wireless communication device 12 to reset the wireless communication device 12 after detecting the voltage change. It should be noted that, resetting the wireless communication device 12 is determined by the software design to reload or reset.

The three control lines GPIO6, GPIO7 and GPIO13 of the main board 122 are connected to a power supplier Vcc (for example, 3.3 volt) via pull-up resistors R1, R2, and R3 respectively. The three control lines GPIO6, GPIO7, GPIO13 and the ground line GND are connected to the spare pins 4, 5, 7 and 8 of the network port 124 respectively, for supplying a signal in relation to a signal receiving strength state of the wireless communication device 12 to the power supply device 14. It should be noted that, the amount of the control lines arranged on the main board 122 and configured for supplying the signal in relation to the signal receiving strength state of the wireless communication device 12, is not limited to be three, it is determined in need and may be one or two.

Referring to FIGS. 1 and 2, the power supply device 14 includes a shell 140, a data input port 141, a power over Ethernet control module 142, a network port 143, an isolation circuit 144, a decoder circuit 145, a signal strength indicator unit 146 and a reset button 147. The data input port 141, the network port 143 and the signal strength indictor unit 146 are generally fixed on the shell 140 and exposed out of the shell 140. The power over Ethernet control module 142, the isolation circuit 144 and the decoder circuit 145 are received in the shell 140.

Preferably, the data input port 141 may be an Ethernet port, such as RJ-45 port (as shown in FIG. 2). Pins 1, 2, 3 and 6 of the data input port 141 are used as signal pins, and pins 4, 5, 7, and 8 thereof are used as spare pins. The power over Ethernet control module 142 is configured for obtaining data signals from the signal pins 1, 2, 3 and 6 of the data input port 141, and integrating the data signals with the power supplied from an outer power supply (not shown) to produce data signals with power. The network port 143 may be also an Ethernet port, such as RJ-45 port. Pins 1, 2, 3 and 6 of the network port 143 are used as signal pins for transmitting the data signals with power to the signal pins 1, 2, 3 and 6 of the network port 124 of the wireless communication device 12 via the network cable 13. Pins 4, 5, 7 and 8 of the network port 143 are used as spare pins for receiving the signal in relation to the signal receiving strength state of the wireless communication device 12, which is supplied from the control lines GPIO6, GPIO7, GPIO13 and the ground line GND of the main board 122 of the wireless communication device 12. The reset button 147 is connected to the power over Ethernet control module 142 for turning on the reset circuit 1221 of the main board 122. For example, the power in the data signals with power produced from the power over Ethernet control module 142, is inversed to turn on the reset circuit 1221 of the main board 122, such that the wireless communication device is reset.

Figure 4:
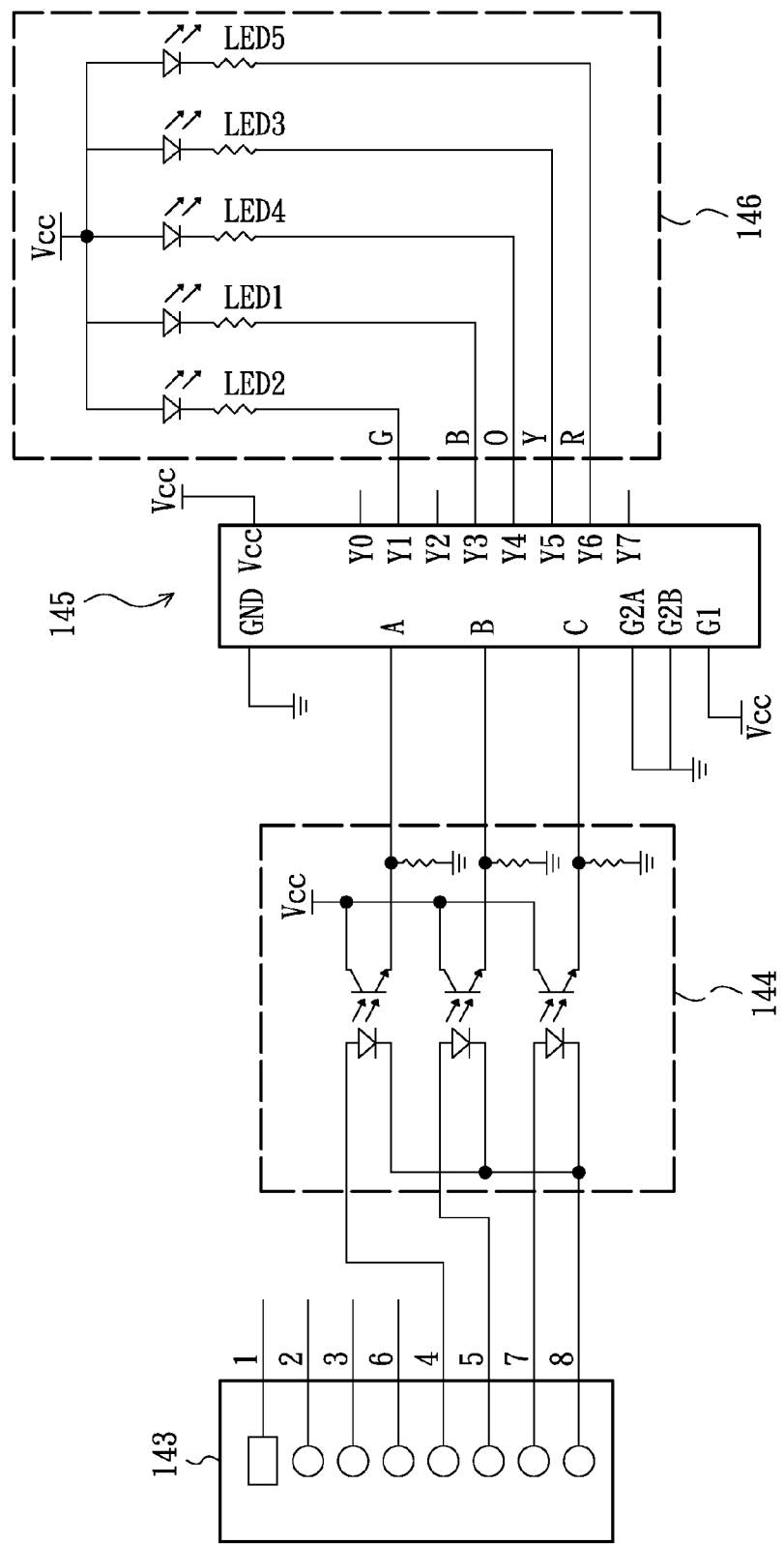
FIG. 4 is a circuit, block diagram of an isolation circuit, a decoder circuit and a signal strength indicator unit of a power supply device of the wireless communication system as shown in FIG. 2.

Referring to FIG. 4 together, the isolation circuit 144 is connected to the spare pins 4, 5, 7 and 8 of the network port 143. The isolation circuit 144 may be a photoelectric isolation circuit (as shown in FIG. 4). The isolation circuit 144 is configured for effectively avoiding the electromagnetic interference. The decoder circuit 145 is connected to the isolation circuit 144. That is, the isolation circuit 144 is coupled between the decoder circuit 145 and the spare pins 4, 5, 7 and 8 of the network port 143. The decoder circuit 145 is configured for generating a signal strength indicator signal according to the signal in relation to the signal receiving strength state of the wireless communication device 12, which is provided from the control lines GPIO6, GPIO7, GPIO13 and the ground line GND of the main board 122. In this exemplary embodiment, the decoder circuit 145 may include a 3-to-8 decoder (as shown in FIG. 4) corresponding to the three control lines GPIO6, GPIO7 and GPIO13. The signal strength indicator unit 146 is connected to the decoder circuit 145 and configured for receiving the signal strength indicator signal produced by the decoder circuit 145 to display the signal receiving strength state of the wireless communication device 12. As shown in FIG. 4, the signal strength indicator unit 146 may include light-emitting diodes LED1, LED2, LED3, LED4, and LED5 for emitting light with different colors. The light-emitting diodes LED1, LED2, LED3, LED4, and LED5 are respectively blue (B), green (G), yellow (Y), orange (O) and red (R) light-emitting diodes for representing grades of the signal strength: excellent, good, ordinary, bad and fail. It should be noted that, the amount of the signal strength indicator unit 146 is not limited, and is determined by the amount of the control lines arranged on the main board 122 of the main board 122 of the wireless communication device 12, which is configured for receiving the signal in relation to the signal receiving strength state of the wireless communication device 12. Alternatively, the light-emitting diodes LED1, LED2, LED3, LED4 and LED5 may be light-emitting diodes with same color to represent the grades of the signal strength by using the amount of turned-on light-emitting diodes.

From the above, the wireless communication device 10 of the present exemplary embodiment, employs the circuit frame of the power supply device 14 including the decoder circuit 145 and the signal strength indicator unit 146, and the corresponding circuit frame of the outdoor wireless communication device 12, such that the power supply device 14 can display the signal receiving strength state of the outdoor wireless communication device 12. Therefore, the signal receiving strength state displayed on the power supply device 14 may be a base for repairing men in the erecting and off-line or repairing process, such that the erecting and repairing time can be decreased. Furthermore, the signal receiving strength state displayed on the power supply device 14 is prone to judge the current signal connecting state of the wireless communication device for the repairing men. In addition, the reset button 147 is convenient to reload or reset the wireless communication device 12. The isolation circuit 144 can avoid effectively the electromagnetic interference.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A power supply device adapted to an outdoor wireless communication device via a network cable, the outdoor wireless communication device including a main board having at least one control line and a ground line arranged thereon, the power supply device comprising:
   a data input port;
   a power over Ethernet control module configured for receiving a data signal from the data input port to generate a data signal with power;
   a network port configured for transmitting the data signal with power to the main board of the outdoor wireless communication device and receiving a signal in relation to a signal receiving strength state of the outdoor wireless communication device provided from the at least one control line and the ground line arranged on the main board;
   a decoder circuit connected to the network port and configured for generating a signal strength indicator signal according to the signal provided from the at least one control line and the ground line; and
   a signal strength indicator unit connected to the decoder circuit and configured for receiving the signal strength indicator signal to display the signal receiving strength state of the outdoor wireless communication device.

2. The power supply device as claimed in claim 1, further comprising a reset button connected to the power over Ethernet control module and configured for turning on a reset circuit of the main board to reset the outdoor wireless communication device.

3. The power supply device as claimed in claim 2, wherein the reset button is configured for inversing the power in the data signal with power to turn on the reset circuit of the main board.

4. The power supply device as claimed in claim 1, further comprising an isolation circuit coupled between the network port and the decoder circuit.

5. The power supply device as claimed in claim 4, wherein the isolation circuit is a photoelectric isolation circuit.

6. The power supply device as claimed in claim 1, wherein the data input port is an RJ-45 port.

7. The power supply device as claimed in claim 1, wherein the network port includes a plurality of signal pins and a plurality of spare pins, the plurality of signal pins are configured for transmitting the data signal with power, and at least one of spare pins is configured for receiving the signal provided from the at least one control line and the ground line.

8. The power supply device as claimed in claim 7, wherein the network port is an RJ-45 port having pins 1, 2, 3, 6 and pins 4, 5, 7, 8, the pins 1, 2, 3, 6 of the RJ-45 port are used as the signal pins, and the pins 4, 5, 7, 8 thereof are used as the spare pins.

9. The power supply device as claimed in claim 7, wherein the at least one control line is three control lines, and the decoder circuit includes a 3-to-8 decoder.

10. The power supply device as claimed in claim 1, wherein the signal strength indicator unit includes a plurality of light-emitting diodes.

11. A wireless communication system, comprising:
    an outdoor wireless communication device including a main board and a first network port, the first network port being connected to the main board, the main board including at least one control line and a ground line arranged thereon, the at least one control line and the ground line being connected to the first network port; and
    a power supply device, the power supply device comprising
      a data input port;
      a power over Ethernet control module configured for receiving a data signal from the data input port to generate a data signal with power;
      a second network port connected to the first network port via a network cable, the second network port being configured for transmitting the data signal with power to the main board of the outdoor wireless communication device and receiving a signal in relation to a signal receiving strength state of the outdoor wireless communication device provided from the at least one control line and the ground line arranged on the main board;
      a decoder circuit connected to the second network port and configured for generating a signal strength indicator signal according to the signal provided from the at least one control line and the ground line; and
      a signal strength indicator unit connected to the decoder circuit and configured for receiving the signal strength indicator signal to display the signal receiving strength state of the outdoor wireless communication device.

12. The wireless communication system as claimed in claim 11, wherein the power supply device further includes a reset button connected to the power over Ethernet control module and configured for turning on a reset circuit of the main board to reset the outdoor wireless communication device.

13. The wireless communication system as claimed in claim 12, wherein the reset button is configured for inversing the power in the data signal with power to turn on the reset circuit of the main board.

14. The wireless communication system as claimed in claim 11, wherein the power supply device further includes an isolation circuit coupled between the network port and the decoder circuit.

15. The wireless communication system as claimed in claim 14, wherein the isolation circuit is a photoelectric isolation circuit.

16. The wireless communication system as claimed in claim 11, wherein the data input port is an RJ-45 port.

17. The wireless communication system as claimed in claim 11, wherein the second network port includes a plurality of signal pins and a plurality of spare pins, the plurality of signal pins are configured for transmitting the data signal with power, and at least one of spare pins is configured for receiving the signal provided from the at least one control line and the ground line.

18. The wireless communication system as claimed in claim 17, wherein the second network port is an RJ-45 port having pins 1, 2, 3, 6 and pins 4, 5, 7, 8, the pins 1, 2, 3, 6 of the RJ-45 port are used as the signal pins, and the pins 4, 5, 7, 8 thereof are used as the spare pins.

19. The wireless communication system as claimed in claim 17, wherein the at least one control line are three control lines, and the decoder circuit includes a 3-to-8 decoder.

20. The wireless communication system as claimed in claim 11, wherein the signal strength indicator unit includes a plurality of light-emitting diodes.

* * * * *